United States Patent [19]

Hauck

[11] Patent Number: 4,706,067
[45] Date of Patent: Nov. 10, 1987

[54] SWITCH ACTUATED COMMUNICATION DEVICE

[76] Inventor: Lane T. Hauck, 5346 Bragg St., San Diego, Calif. 92122

[21] Appl. No.: 863,339

[22] Filed: May 15, 1986

[51] Int. Cl.$^4$ .......................... G09B 5/36; H03R 13/00
[52] U.S. Cl. ................................. 340/365 R; 340/711; 340/706; 178/26 A; 178/82 A
[58] Field of Search ........... 340/365 R, 365 S, 825.71, 340/825.19, 384 E, 407, 753, 792, 712, 711, 706; 178/26 R, 26 A, 115, 113, 89, 82 R, 82 A, 82 B; 434/222, 223, 111, 116

[56] References Cited

U.S. PATENT DOCUMENTS 2,923,069  2/1960  Nachem ............................. 434/222
3,895,185  7/1975  Ramsey ............................ 178/26 R
4,255,749  3/1981  Henry .............................. 178/26 A
4,408,302 10/1983  Fessel et al. ..................... 340/792

Primary Examiner—John W. Caldwell, Sr.
Assistant Examiner—Alvin Oberley
Attorney, Agent, or Firm—Bernard L. Kleinke

[57] ABSTRACT

A device for generating an output information message by the manipulation of a single switch, to form a sequence of switch closures of varying duration. The device includes dot feedback circuitry responsive to a switch closure, for generating a human-sensible dot feedback signal to alert an operator that the switch closure should be discontinued if a dot signal is intended. Dot generation circuitry responds to the switch closure being discontinued within a preselected first timing interval following detection of the switch closure, and generates a dot information signal. Dash feedback circuitry responds to a switch closure that is not discontinued within the first timing interval, for generating a human-sensible dash feedback signal, to alert an operator that the switch closure is of sufficient duration to be interpreted as a dash. Dash generation circuitry responds to the switch closure being continued beyond the preselected first timing interval, and generates a dash information signal. Decoding circuitry converts a coded sequence of dot and dash information signals generated in this manner, to an output information message.

15 Claims, 6 Drawing Figures

SWITCH ACTUATED COMMUNICATION DEVICE

TECHNICAL FIELD

This invention relates generally to communication devices, and it more particularly relates to a device for generating an output information message by the manipulation of a single switch

BACKGROUND OF THE INVENTION

Communicating is often difficult, and even virtually impossible, for the physically impaired. Speech impairment may prevent audible communication, for example, while further lack of muscle control may prevent communicating data or commands to a machine, such as a computer. In many cases, the physically impaired person is able to do little more than breathe, and an otherwise active and functional mind is excluded from interaction with his or her environment.

Of the various existing communication aids available for generating an output information message in a desired format, those called single switch devices are designed to be used by anyone who can manage to operate a single switch. Scanning devices are one example. Such a device employs a two dimensional matrix of illuminated cells, each cell containing a letter, number, word, or phrase for the operator to select.

The device sequentially selects one row of the matrix at a time, by illuminating all the elements in each row. The operator presses a switch to select an illuminated row, and the scanning then begins to cycle between the various cells in the selected row, illuminating them sequentially one at a time. A second switch closure is used to select the desired cell in the row. By this technique, an information message can be generated by the manipulation of a single switch.

Although enabling an operator to display a selected character combination, this method has certain drawbacks. Firstly, it is slow since the entire matrix must be scanned to reach a particular cell. Secondly, the anticipation and reaction time required to press the switch at just the right moment, can be difficult, especially to a physically impaired operator. Thirdly, the apparatus is usually bulky and expensive, and thus confines its use to classroom or therapy situations. Thus, another means of communicating with a single switch device is desirable, both for the physically impaired and other operators desirous of using a single switch input.

The Morse Code is also employed by those who are physically handicapped. For example, a Morse Code computer translator, such as the Adaptive Firmware Card, can be purchased from Adaptive Peripherals, of Seattle, WA., may be employed by those only able to use a single switch. Since such a translator device is adapted to be used with conventional computers, it is capable of being used only with a particular computer model, and the size and power requirements of the computer and peripheral card, make portability difficult. Also, the cost for purchasing such equipment prohibits wide spread use for the physically impaired.

In the Morse Code, which is inherently a "single-switch" code, letters, numbers, and punctuation elements are formed by groups of short and long switch closures, called dots and dashes. However, reasonable skill is required to form the properly timed sequence of dots, dashes, and spaces in between, to form the Morse Code characters. Such rhythmical manipulation is often beyond the ability of uninitiated operators, and especially many physically impaired operators.

The rhythm of the Morse Code requires time and coordination to learn. For some, it is virtually impossible to release the switch for the proper length of time to form the spaces between the dots and dashes. An even more difficult task is the formation of the longer spaces between characters. Varying sending speeds, that often characterize a novice operator, introduces character ambiguities, such as three fast letter "T's", which have the same relative timing as a slow letter "S".

Thus, it would be desirable to have a device that overcomes the difficulties associated with forming the carefully timed sequences of dots, dashes, and spaces of the Morse Code or similar on-off character code, so that a physically impaired person could somehow make use of the Morse Code for communication purposes. Also, it would be well to have such a device that would be relatively inexpensive to manufacture, and be very light in weight and small in size for portability.

DISCLOSURE OF THE INVENTION

Therefore, the principal object of the present invention is to provide a new and improved device for enabling an operator to generate an output information message by the manipulation of a single switch in such a convenient manner, that even a physically impaired person can readily gain facility in its proper use.

A further object of the present invention is to provide such a new and improved device, which overcomes the skill requirements of physical agility usually associated with switch manipulation, particularly the ability to form the properly timed dots, dashes, and spaces of the Morse Code, at a wide range of sending styles, with little or no errors.

Another object of the present invention is to provide such a new and improved device, which is small in size, relatively inexpensive to manufacture, and portable—one with improved functionality, not requiring the use of a dedicated computer system.

Briefly, the above and further objects of the present invention are realized by providing a new and improved communications device, which generates an output information message by the manipulation of a single switch, and which employs input circuitry for detecting a sequence of switch closures of varying duration.

The communications device includes dot feedback circuitry responsive to the input circuitry detecting a switch closure, for generating a human-sensible dot feedback signal to alert an operator that a switch closure has been detected and that the switch closure should be discontinued if a dot is intended. Dot generation circuitry responds to the switch closure being discontinued within a preselected first timing interval after detection of the switch closure, and generates a dot information signal.

The device also includes dash feedback circuitry, which responds to the input circuitry detecting a switch closure that is not discontinued within said first timing interval, and generates a human-sensible dash feedback signal. This signal alerts an operator that the duration of the switch closure is beyond that of a dot, and to discontinue the switch closure if a dash is intended. Dash generation circuitry responds to the switch closure being continued past the preselected first timing interval after said first timing interval, and generates a dash information signal. Decoding circuitry converts a coded sequence of dot and dash information signals generated in this manner to an output information message in a desired format.

In one form of the invention, display components provide a visually discernible image of the information message. In another form of the invention, conversion circuitry generates an information message output signal in a desired character code.

Thus, by generating the various novel feedback signals, the device provides a great improvement over existing single switch devices, by enabling the user to perform the desired code formation, without the necessity for a high level of manual dexterity to perform the desired rhythmical manipulations for generating a coded message. The device is small, portable and inexpensive to manufacture. It provides feedback to a user to enable proper character code formation, while employing microprocessor circuitry having the capability of full compatibility with existing computer systems. The unique device discerns dots and dashes, produced even by persons possessing only very limited coordination using single switch devices, such as a breath activated switch.

In addition, one form of the invention includes a device to perform a backspace function, to enable an incorrect letter to be erased and re-sent. Also, the device can perform a clear function to delete the display in preparation for a new message. Another form of the invention features an arrangement whereby after each word is received, the complete word is transmitted in a form that is easily interfaced with standard computer equipment, such as computers, printers, or modems. Thus, the output of the device may be ASCII Code, and make the device compatible with various different conventional computers.

Yet another form of the invention features an arrangement to store specific messages in the device, for later retrieval by the user in response to the entering of a preselected series of Morse Code characters. For example, entering the Morse Code for the numeral "3" (dot-dot-dot-dash-dash) can retrieve quickly the pre-stored message "I NEED HELP" to cause its display in a emergency situation.

The inventive device is operable by the novice operator, as well as the physically impaired operator having limited ability to produce the rhythmically timed character code of Morse Code. The device is a stand-alone, extremely easy to operate communication aid that can be operated with any conventional operator-selected switch.

BRIEF DESCRIPTION OF THE DRAWINGS

The above and other objects and features of this invention and the manner of attaining them, will become apparent, and the invention itself, will be best understood, by reference to the following description of an embodiment of the invention, taken in conjunction with the accompanying drawings, wherein.

DETAILED DESCRIPTION

Figure 1:
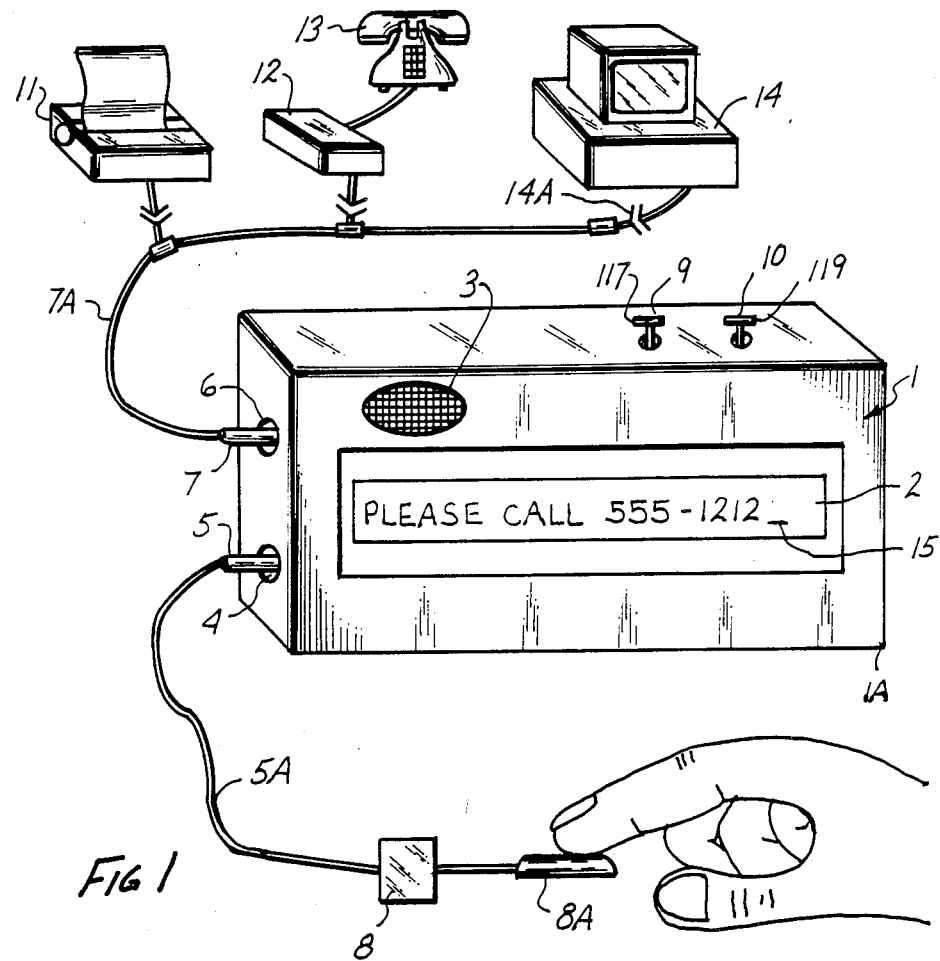
FIG. 1 is a schematic pictorial view of a device constructed according to the invention, and shown connected to a finger switch and to a typical complement of computer system components.

Referring now to the drawings, and more particularly to FIG. 1 thereof, there is shown a device 1, which is constructed according to the present invention. The device 1 generally comprises a display panel 2 for providing a visually discernible image of an output information message generally indicated at 2A, and a speaker 3 for generating an audible feedback signal to an operator.

Input jack 4 receives input plug 5 to interconnect the device 1 via a cable 5A to separate ON-OFF switch 8, actuatable by the operator by means of a finger engageable switch actuator member 8A. A typical complement of computer system components, such as a printer 11, a modem 12 together with a telephone 13, and a personal computer system 14 can be individually connected alternatively, via an output jack 6, which receives an output plug 7 connected at one end of a cable 7A. The other end of the cable 7A can be connected to any one of the component via a suitable connector, such as the connector 14A for the component 14.

The device 1 includes a timing pushbutton 9 and timing pushbutton 10 on the top of a housing 1A of the device 1, to enable an operator to decrease or increase respectively, the speed at which switch closures must be made to actuate the device properly.

Switch 8 may be any operator-selected switch. It is a single-pole-single-throw switch having a single set of contacts 8 (FIG. 6), which can be selectively opened and closed as desired by the operator. It will become apparent to those skilled in the art, that the switch 8 and its actuator member 8A may be replaced by many different types and kinds of such devices, including breath actuated switches, foot or toe switches, and others.

The computer 14 may be a conventional personal computer system such as that manufactured by IBM Corporation, located in New York, and marketed under the trade name IBM PC/AT. The computer or the other components are interconnected to the device 1 by a conventional serial RS-232 interconnection, via the plug 7.

In operation, the device 1 is operated by manipulating the switch 8 to generate a sequence of switch closures, which the device 1 detects and converts to an output information message 2A. As the sequence of switch closures are detected by the device 1, audio feedback signals are provided via speaker 3 to assist the operator to time properly the opening and closing of the switch 8. In addition, a visually discernible image of the output information message serves as an additional feedback signal, and is provided on display panel 2 as it is being generated, one character at a time, to assist the operator to visualize the message that has been generated. The operator can decrease or increase the speed at which switch closures must be made by depressing respectively either the timing pushbutton switch 9 or the timing pushbutton switch 10 during a speed adjustment mode of operation.

Once the timing is adjusted for a particular operator, the user is then ready to display messages, such as the message 2A on the display 2. In order to operate the device 1, the operator need only follow three simple procedures to enter the information in an accurate manner, to cause the desired message to be displayed.

In the preferred form of the invention, the input information is entered according to the Morse Code. Thus, the first procedure to be followed, is the procedure for the entering of a dot signal. In order to enter a Morse Code dot signal, the operator presses down on the member 8A to close the switch 8, and maintains the member 8A in the down position until the speaker 3 generates an audible dot feedback signal. The signal is in the form of a distinctive tone. Once this feedback signal is generated, the operator then releases the member 8A to cause the switch 8 to open.

The second procedure to be learned by the operator, is the technique for entering the Morse Code dash signal. This is accomplished by following the procedure for the entry of a dot signal, except that the operator merely continues to maintain the switch in a closed position, even after the dot feedback tone signal is heard by the operator. To enter a dash signal, the operator continues to maintain the switch 8 closed, until an audible dash feedback tone signal is generated by the speaker 3, in place of the dot signal. This second tone signal is preferably a clearly distinguishable tone signal, as compared to the first tone signal generated. Once the dot tone signal changes to the dash tone signal, the member 8A is then released to cause the switch 8 to open.

The third procedure to be learned, is the technique for entering an inter-character pause signal, following the entry of a combination of Morse Code dash/dot signals representing a character to be displayed. To enter this signal, once the operator completes the entry of the last dot or dash signal of the character, the entered Morse Code signals then are decoded by the device 1, and after a predetermined time delay interval expires, the character appears on the display 2. The character display serves as a visual feedback signal to the operator, to prompt him or her to enter further dot and dash signals, if desired, because the device 1 is now ready to accept them.

Upon the detection of a space character following a completed word, the word is sent to one of the components, such as the computer 14.

Figure 2:
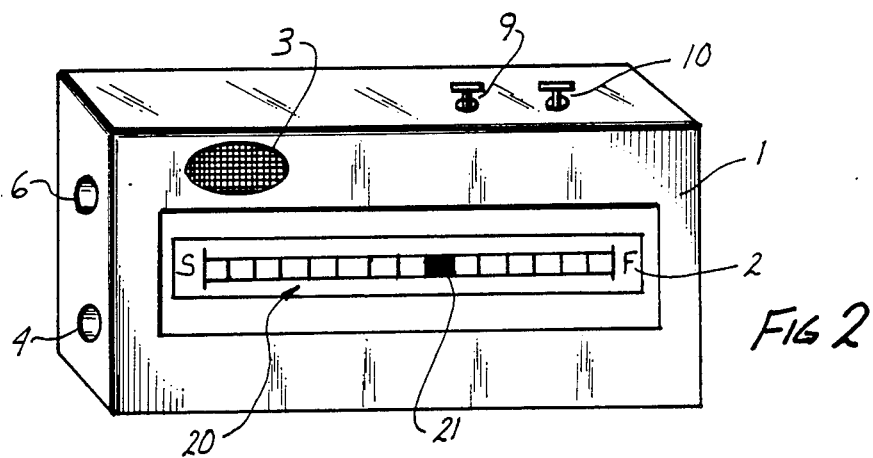
FIG. 2 is a pictorial view of the device of FIG. 1, illustrating it displaying its timing adjustment display.

Referring now to FIG. 2, in order to adjust the speed, when either timing pushbutton switch 9 or 10 is depressed, any output information message currently displayed on the display panel 2 is deleted, and replaced by the alternate display message 20, showing a range of incremental timing adjustments extending at one end from the slowest speed at the letter "S", to the fastest speed at letter "F" at the opposite end. A cursor 21 is also displayed in a position along the range of incremental timing adjustments corresponding to the timing rate at which the device 1 is set.

By depressing either the pushbutton 9 or the pushbutton switch 10, the cursor 21 moves either leftwardly toward the slow position S, or rightwardly toward the fast position F, respectively, until cursor 21 is in a position corresponding to a desired input speed for the operator. Releasing the timing pushbutton, an operator can adjust the speed at which switch closures must be generated to properly activate the device 1. Each time the timing pushbutton 9 is depressed and released, the cursor 21 moves one position incrementally leftwardly, indicating that device 1 will now accept switch closures at a lower speed setting. Each time timing pushbutton switch 10 is depressed and released, the cursor 21 advances incrementally one position to the right, to indicate that the device 1 will now accept switch closures at a higher rate of speed.

For the purpose of communicating messages with the device 1, once the timing of the device is set at a desired level, the operator proceeds to open and close the switch 8 repeatedly. The device 1 detects the signal from the switch 8, and converts the signals to an output information message. It is to be understood that a device constructed according to the invention may employ different on-off codes but the operation of the device 1, is based on the Morse code.

A reference time for the duration of a dash is, therefore, first established using timing pushbuttons 9 and 10. The reference time which has found to be comfortable for most operators is preset when the device 1 is first used. Pressing timing pushbutton switches 9 and/or 10 modifies this reference time to suit the individual operator.

Figure 3:
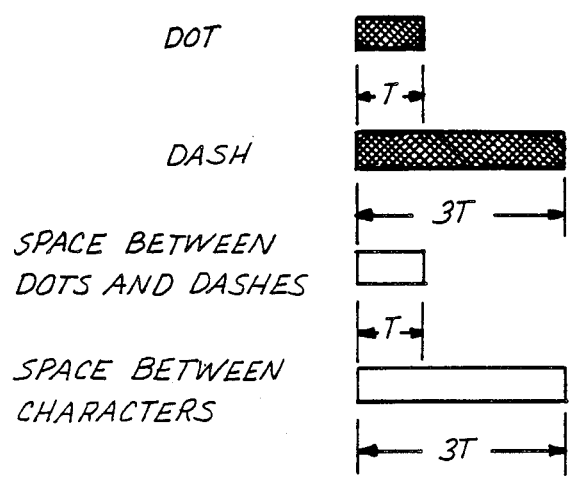
FIG. 3 is a timing diagram of ideal Morse Code dots and dashes.
Figure 4:
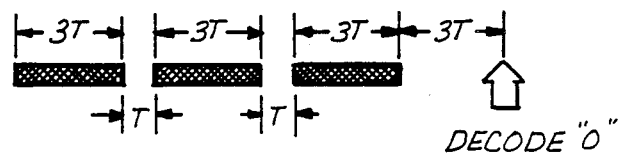
FIG. 4 is a timing diagram demonstrating a sequence of dashes that form the letter "0" in Morse Code.
Figure 5:
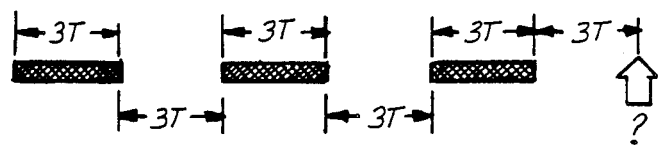
FIG. 5 is a timing diagram showing the ambiguity between a Code "T" and "S"

FIGS. 3-5 illustrate some general timing concepts employed in the Morse code, with dark lines indicating the duration of a switch closure. Thus, in FIG. 3, a dot is represented by a switch closure having a duration of one arbitrary unit of time, "T", and a dash is represented by a switch closure having a duration of 3T. Hence, a dash is three times longer in duration than a dash.

As shown in FIG. 4, the space between dots and dashes is represented by opening the switch for a duration of T, and the space between characters is represented by opening the switch for a duration of 3T (FIG. 3).

Different combinations of dots, dashes, and spaces formed according to these timing requirements, produce conventional Morse code characters.

FIG. 4 illustrates the letter "0" in Morse code. The code comprises three dashes, each of a duration 3T, with inter-dash spaces, each having a duration of T. The inter-character spacing is 3T, and is shown, in FIG. 4, following the third dash. In Morse Code, similar combinations exist for each of the other letters of the alphabet, as well as for each numeral and certain punctuation marks.

One of the problems that is associated with the generation and decoding of Morse code, is the ambiguity posed by certain character codes. Thus, as shown in FIG. 5, three dashes, each of duration 3T, are separated by a pair of spaces, which are each of duration 3T. This code can be decoded, either as a slow letter "S" (three dots), or a "T" (dash repeated three times).

Therefore, it is important to note that the switch open interval is critically important in the formation of Morse Code. What is often troublesome to an inexperienced operator, is the concept that the silent, switch open, interval is also important. For example, an experienced operator may erroneously send an "0" (dash-dash-dash), with open and closed switch intervals of approximately equal duration. Such problem is entirely overcome by the device 1, of the present invention, by providing feedback to the user.

Figure 6:
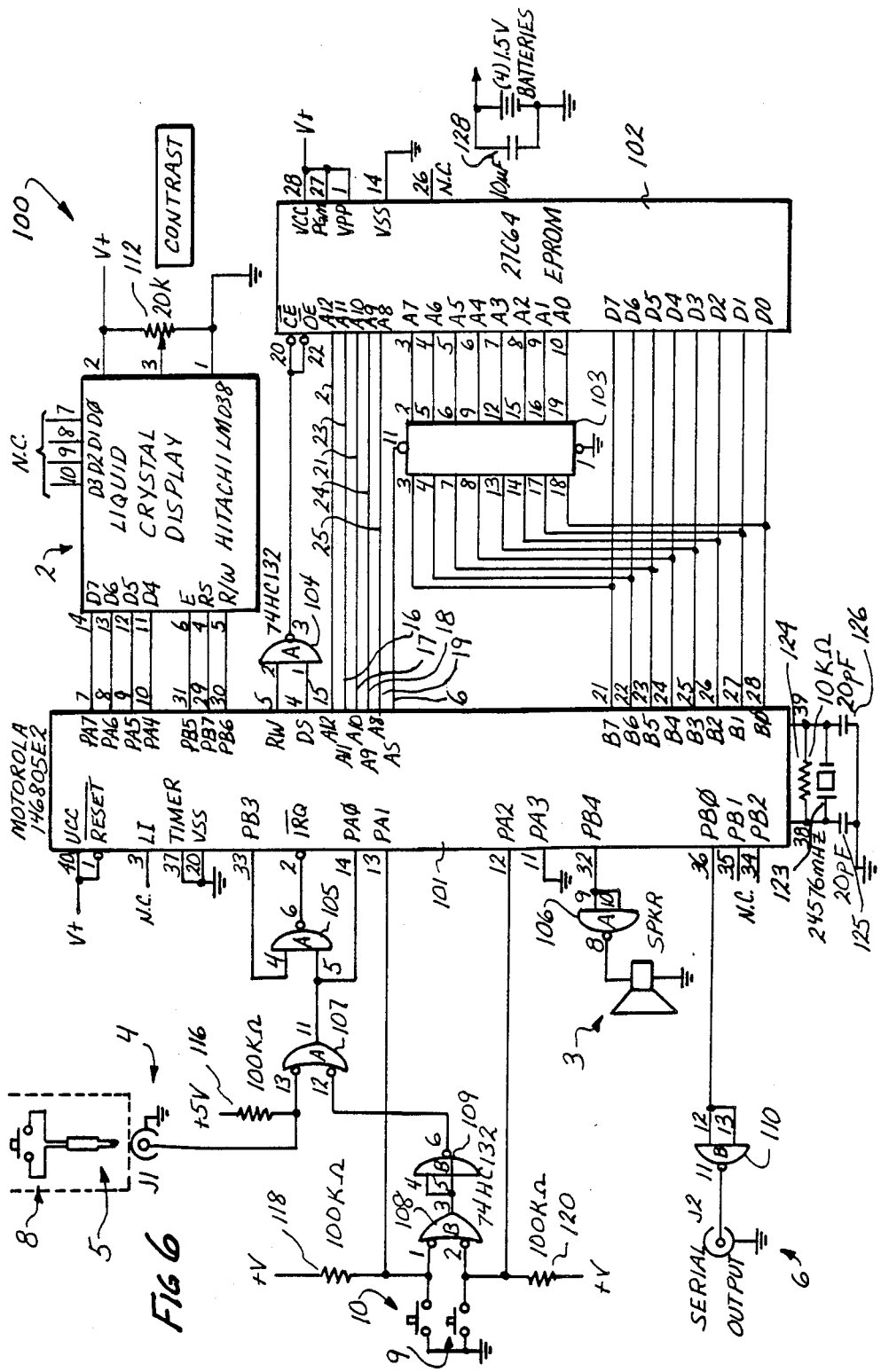
FIG. 6 is a schematic circuit diagram of the device of FIG. 1.

As shown in FIG. 6, this is accomplished using a microcomputer circuit 100 within the device 1 that employs a readily available single chip computer 101, together with associated circuitry. The computer 101, may be the one manufactured by Motorola as Part No. 146805E2. The computer 101 includes a central processing unit (not shown), a random access memory (not shown), and an input/output system (not shown) in one integrated circuit (IC). This IC is fully described in the Motorola publication entitled "M6805 HMOS/M146805 CMOS Family User's Manual", Second Edition, Library of Congress Catalog No. 83-60771.

An electronically programmable read only memory 102, and a latch 103 store a computer program for the device 1. Latch 103 serves to de-multiplex the address and data buses, which originate from computer 101. Schmitt trigger input NAND gates 104–110, are used for various logic functions, as hereinafter described in greater detail.

The latch 103 is a 74HC373 Latch available from RCA, and the NAND gates 104–110 are 74HC132 Schmitt trigger input NAND gates, which are also available from RCA, as well as other manufacturers, as described in various manufacturer's data books, for example, "QMOS High-Speed CMOS Logic IC's", Publication SSD-290A, of RCA Corporation.

The EPROM memory 102 is a 27C64 EPROM available from Hitachi America, Ltd., and others, as described in various manufacturer's data books, such as "IC Memories Data Book", #M11, Hitachi America, Ltd., San Jose, Calif.

A liquid crystal display module 111 is connected to an output of the computer 101. The display module is capable of being connected to a computer using either a 4-bit or 8-bit data interface. The preferred form of the invention employs the 4-bit interface, to conserve input-/output pins on the computer 101. The module 111 is a liquid crystal display module available from Hitachi as Model Number LM-038, as fully described on pages 23-30 and 52-54 of the publication entitled "Hitachi Dot Matrix Liquid Crystal Display", available from Hitachi America, Ltd., San Jose, Calif.

A potentiometer 112 adjusts the contrast of the display module 111. A control knob for the potentiometer is not shown in FIG. 1, but would be positioned on the housing 1A, for operator convenience.

The switch 8 includes a pair of contacts 113 connected electrically to the plug 5. Resistor 116 serves to present a logic high level to gate 107 when the switch 8 is opened. Closing switch 113 presents a logic low level to the gate 107 via the connection to ground potential by the input jack 4.

The switches 9 and 10 include respective control buttons 117 and 119. The switches 9 and 10 are connected to respective "pull-up" resistors 118 and 120, which serve to present logic high levels to the inputs of the gate 108 when the switches are opened.

The gates 108 and 109 provide an OR function, in that when either of the switches 9 or 10 is closed, the output of the gate 109 is a logic low level. The gate 107 serves an OR function of the external switch 8 and the two internal switches 9 and 10, such that when any of the three switches is pressed, the output of gate 107 goes to a high level.

In addition, the switches 9 and 10, and the output of the gate 107, are connected to three input pins of the computer 101. These inputs, shown as PA0, PA1, and PA2, are used to detect when the switch 10 is closed (PA1), when the switch 9 is closed (PA2), and when any of the three switches is closed (PA0). Detecting the condition that PA0 is high and PA1 and PA2 are low, serves to detect the fact that the switch 8 is closed.

The output of gate 107 is connected to the gate 105, which has its other input is connected to an output (PA3) of the computer 101. The output of the gate 105 serves as an Interrupt Request signal to the computer 101. Output (PB3) thus serves as a control signal, to either pass or block interrupt requests from reaching the computer 101. Thus, interrupts are temporarily shut off, when an interrupt service routine is in progress. Thus, repeated interrupts are avoided for the same cause.

The switches are connected in this manner to take advantage of a unique construction of the computer 101. This computer has a "STOP" instruction, which terminates all computer activity, and causes it to enter a very low power quiescent mode. The quiescent mode is exited, and the computer activity resumes, when it receives an interrupt from an outside source.

Thus, activating any of the three switches 8, 9 or 10, causes an interrupt request via the gate 105, and turns the computer on for processing of the Morse Code character. When the character is decoded and displayed, the computer enters the stop state, and reduces its power consumption accordingly. This unique mode allows very low power consumption, and eliminates the need for an "on-off" switch on the unit.

The gate 106 serves as a buffer for the speaker 3. Tones are produced with the speaker 3, by programming a periodic signal at output PB4 of the computer 101. The frequency is controlled by the software program.

The gate 110 serves as a buffer for the serial output jack 6. The serial output is caused by software toggling of an output PB0 of the computer 101.

A crystal 123 and resistor 124 supply the frequency reference for the on-chip oscillator in the computer 101. A pair of capacitors 125 and 126 are recommended to stabilize the oscillator startup.

A battery 127 includes of four AA ("penlight") batteries, connected in series, to provide 4–6 volts for powering the device 1. Capacitor 128 provides smoothing for the power supply.

Turning now to the following Table A, there is shown a fully commented listing of the software computer program employed in the device 1. The listing shows code developed using an assembler for the computer 101, which assembler is available from S-C Software, Dallas, Tex. The assembler and its syntax is fully described in the manual, "S-C Macro Assembler", from S-C Software Corp.

Table A

```
            1030  *----------------------------
            1040        .OR  $0080        .
            1050        .TA  $4080
0800-       1060  X     .EQ  $0800     ; XFR PROGRAM
            1070  *----------------------------
0000-       1080  DEBOUN  .EQ  $00
0014-       1090  DISLEN  .EQ  20       ; display length
00C0-       1100  DASHTONE .EQ  $C0
```

```
00F8-         1110 DOTTONE .EQ $F8
00F0-         1120 ERASETC .EQ $F0
              1130 *------------------------------
0000-         1140 PORTA   .EQ 0
0001-         1150 PORTB   .EQ 1
0002-         1160 PORTC   .EQ 2
0004-         1170 DDRA    .EQ 4
0005-         1180 DDRB    .EQ 5
0008-         1190 TIMER   .EQ 8
0009-         1200 TCSR    .EQ 9
              1210 *------------------------------
0040-         1220 RAM     .EQ $40
0040-         1230 RATE    .EQ RAM        ; 2-17
0041-         1240 TONETC  .EQ RATE+1
0042-         1250 CPOS    .EQ TONETC+1
0043-         1260 TEMP    .EQ CPOS+1
0044-         1270 WRDATA  .EQ TEMP+1
0045-         1280 CTH     .EQ WRDATA+1
0046-         1290 CTL     .EQ CTH+1
              1300 *------------------------------
0047-         1310 DCOUNT  .EQ CTL+1
0048-         1320 DPAT    .EQ DCOUNT+1
0049-         1330 BSTC    .EQ DPAT+1     ; b/s t.c.
0049-         1340 FLAG    .EQ DPAT+1
004A-         1350 SPEEDF  .EQ FLAG+1     ; rate update
004B-         1360 DD      .EQ SPEEDF+1
004C-         1370 TH1     .EQ DD+1       ; dot end thresh
004D-         1380 TH2     .EQ TH1+1      ; b/space thresh
004E-         1390 TH3     .EQ TH2+1      ; EOC thresh.
004F-         1400 DBCTR   .EQ TH3+1      ; debounce ctr
0050-         1410 SOTEMP  .EQ DBCTR+1
0051-         1420 TX1     .EQ SOTEMP+1
0052-         1430 BUFF    .EQ TX1+1
              1440 *------------------------------
              1450 * Port A Bit Assignments:
              1460 *------------------------------
              1470 * Bits 7:4  LCD i/o data
              1480 *------------------------------
0003-         1490 a3      .EQ 3          ; spare input
0002-         1500 SLSW    .EQ 2          ; slower switch
0001-         1510 FASW    .EQ 1          ; faster switch
0000-         1520 KEY     .EQ 0          ; main switch
              1530 *------------------------------
              1540 * NOTE: input sw is PA0 and IRQ.
              1550 *------------------------------
              1560 * Port B BIT Assignments:
              1570 *------------------------------
0007-         1580 RS      .EQ 7          ; LCD panel
0006-         1590 RD      .EQ 6          ; LCD panel
0005-         1600 E       .EQ 5          ; LCD panel
0004-         1610 SPKR    .EQ 4          ; speaker
0003-         1620 INTEN   .EQ 3          ; interrupt enable
0002-         1630 b2      .EQ 2          ; spare output
0001-         1640 b1      .EQ 1          ; spare output
0000-         1650 UAOUT   .EQ 0          ; UART output
              1660 *------------------------------
              1670 * Display commands
```

```
                1680 *------------------------------
0001-           1690 CLEAR   .EQ $01
0002-           1700 HOME    .EQ $02
0006-           1710 M.CRNS  .EQ $06 ; cur rt,no shift
0007-           1720 M.CRSH  .EQ $07 ; cur rt, shift
000E-           1730 DISON   .EQ $0E ; dispaly ON
0010-           1740 CLNS    .EQ $10 ; c left no shift
0014-           1750 CRNS    .EQ $14 ; c rt   no shift
0018-           1760 CLSH    .EQ $18 ; c left shift dis
001C-           1770 CRSH    .EQ $1C ; c rt   shift dis
0020-           1780 FORMAT  .EQ $20 ; 4-bit,5x7,1 line
                1790 *------------------------------
                1800 * Macros.
                1810 *------------------------------
                1820         .MA TONEON
                1830         BCLR 6,TCSR
                1840         .EM
                1850 *
                1860         .MA TONEOFF
                1870         BSET 6,TCSR
                1880         BSET 4,PORTB ; 0V on spkr
                1890         .EM
                1900 *
                1910         .MA CTL
                1920         BCLR RS,PORTB
                1930         .EM
                1940 *
                1950         .MA DATA
                1960         BSET RS,PORTB
                1970         .EM
                1980 *
                1990         .MA HOME
                2000         LDA #HOME
                2010         >CTL
                2020         SWI
                2030         .EM
                2040 *
                2050         .MA CLEAR
                2060         LDA #CLEAR
                2070         >CTL
                2080         SWI
                2090         .EM
                2100 *
                2110         .MA CRNS
                2120         LDA #CRNS
                2130         >CTL
                2140         SWI
                2150         .EM
                2160 *
                2170         .MA CUROFF
                2180         LDA ##0C
                2190         >CTL
                2200         SWI
                2210         .EM
                2220 *
                2230         .MA CURON
                2240         LDA ##0E
```

```
                        2250            >CTL
                        2260            SWI
                        2270            .EM
                        2280 *------------------------------
                        2290 * Message area: 128 bytes on page
                        2300 * zero, that can be reached by
                        2310 * indirect (,X) addressing.
                        2320 *------------------------------
0080- 53                2330 MS      .AS 'S'
0081- 04 05 05
0084- 05 05 05
0087- 05 05 05
008A- 05                2340         .HS 040505050505050505
008B- 05 05 05
008E- 05 05 05
0091- 05 06             2350         .HS 0505050505050506
0093- 46                2360         .AS 'F'
0094- FF                2370         .HS FF
                        2380 *------------------------------
                        2390 * IRQ: Exit from STOP state
                        2400 *------------------------------
0095- 17 01             2410 IRQ     BCLR INTEN,PORTB ; IRQ OFF
0097- 80                2420         RTI
                        2430 *------------------------------
0098- 1F 09             2440 TIMINT  BCLR 7,TCSR      ; re-arm int
009A- B6 41             2450         LDA TONETC
009C- B7 08             2460         STA TIMER
009E- A6 10             2470         LDA #$10         ; BIT 4
00A0- B8 01             2480         EOR PORTB        ; toggle it
00A2- B7 01             2490         STA PORTB
00A4- 80                2500 .1      RTI
                        2510 *------------------------------
00A5- A6 08             2520 PWRON   LDA #8           ; default
00A7- B7 40             2530         STA RATE         ; rate
                        2540 *------------------------------
00A9- 4F                2550 RESET   CLRA
00AA- B7 00             2560         STA PORTA        ; 00000000
00AC- B7 01             2570         STA PORTB        ; 00000000
00AE- B7 04             2580         STA DDRA         ; iiiiiiii
00B0- B7 09             2590         STA TCSR
00B2- A6 FF             2600         LDA #$FF         ; oooooooo
00B4- B7 05             2610         STA DDRB
00B6-                   2620         >TONEOFF
00B6- 1C 09             0000>        BSET 6,TCSR
00B8- 18 01             0000>        BSET 4,PORTB     ; OV ON SPKR
                        2630 *------------------------------
                        2640 * Clear entire RAM except RATE
                        2650 *------------------------------
00BA- AE 7F             2660         LDX #$7F
00BC- 4F                2670         CLRA
00BD- F7                2680 .1      STA ,X
00BE- 5A                2690         DECX
00BF- A3 40             2700         CPX #$40
00C1- 26 FA             2710         BNE ..1
                        2720 *------------------------------
                        2730 * Blank the display buffer
                        2740 *------------------------------
```

```
00C3- A6 20        2750           LDA  #$20       ; BLANK
00C5- 5F           2760           CLRX
00C6- E7 52        2770     .2    STA  BUFF,X
00C8- 5C           2780           INCX
00C9- A3 14        2790           CPX  #20        ; END?
00CB- 26 F9        2800           BNE  .2
                   2810  *--------------------------------
00CD- CD 03 AC     2820           JSR  INIT
                   2830  *--------------------------------
00D0-              2840           >TONEOFF
00D0- 1C 09        0000>          BSET 6,TCSR
00D2- 18 01        0000>          BSET 4,PORTB    ; 0V ON SPKR
00D4- 9A           2850           CLI             ; INT ON
00D5-              2860           >HOME
00D5- A6 02        0000>          LDA  #HOME
00D7-              0000>          >CTL
00D7- 1F 01        0000>>          BCLR RS,PORTB
00D9- 83           0000>          SWI
                   2870  *--------------------------------
                   2880  * Preset threshholds
                   2890  *--------------------------------
00DA- BE 40        2900           LDX  RATE
00DC- 5A           2910           DECX
00DD- 5A           2920           DECX
00DE- D6 04 54     2930           LDA  DASHTIME,X
00E1- B7 4C        2940           STA  TH1
00E3- 48           2950           ASLA
00E4- BB 4C        2960           ADD  TH1
00E6- B7 4D        2970           STA  TH2
00E8- B7 4E        2980           STA  TH3
                   2990  *--------------------------------
00EA- 9B           3000  LOOP     SEI             ; disable int
00EB- 16 01        3010           BSET INTEN,PORTB ; gate on
00ED- 2E 04        3020           BIL  HOTINT     ; one waiting
00EF- 9A           3030           CLI             ; back on
00F0- 8E           3040           STOP            ; await intr.
00F1- 20 03        3050           BRA  NEWCHAR
                   3060  *--------------------------------
                   3070  * An interrupt is waiting. Do the
                   3080  * same action as the IRQ routine
                   3090  * and turn on interrupts for the
                   3100  * timer (tone generator).
                   3110  *--------------------------------
00F3- 17 01        3120  HOTINT   BCLR INTEN,PORTB ;gate off
00F5- 9A           3130           CLI             ; int's on
                   3140  *--------------------------------
                   3150  NEWCHAR
00F6- 03 00 3B     3160           BRCLR 1,PORTA,FASTER
00F9- 04 00 03     3170           BRSET 2,PORTA,.9
00FC- CC 01 86     3180           JMP  SLOWER
00FF- 00 4A 03     3190     .9    BRSET 0,SPEEDF,.1
0102- CC 01 C3     3200           JMP  NEW.2      ; no rate update
                   3210  *--------------------------------
                   3220  * Finished rate update.
                   3230  *--------------------------------
                   3240  * Restore the display and cursor
                   3250  *--------------------------------
```

```
0105- CD 04 0E  3260 .1        JSR DEBOUNCE
0108- 5F        3270           CLRX
0109-           3280           >HOME
0109- A6 02     0000>              LDA #HOME
010B-           0000>              >CTL
010B- 1F 01     0000>>                 BCLR RS,PORTB
010D- 83        0000>              SWI
010E- E6 52     3290 .2        LDA BUFF,X
0110-           3300           >DATA
0110- 1E 01     0000>              BSET RS,PORTB
0112- 83        3310           SWI
0113- 5C        3320           INCX
0114- A3 14     3330           CPX #20
0116- 26 F6     3340           BNE .2
0118- B6 42     3350           LDA CPOS
011A- AA 80     3360           ORA #$80
011C-           3370           >CTL
011C- 1F 01     0000>              BCLR RS,PORTB
011E- 83        3380           SWI
                3390 *------------------------------
011F- 11 4A     3400           BCLR 0,SPEEDF
0121-           3410           >CURON
0121- A6 0E     0000>              LDA #$0E
0123-           0000>              >CTL
0123- 1F 01     0000>>                 BCLR RS,PORTB
0125- 83        0000>              SWI
                3420 *------------------------------
                3430 * Restore update mode
                3440 *------------------------------
0126- B6 42     3450           LDA CPOS
0128- A1 13     3460           CMP #DISLEN-1
012A- 25 05     3470           BLO .3          ; not at end
012C- A6 07     3480           LDA #M.CRSH
012E-           3490           >CTL
012E- 1F 01     0000>              BCLR RS,PORTB
0130- 83        3500           SWI
0131- CC 01 C3  3510 .3        JMP NEW.2
                3520 *------------------------------
0134-           3530 FASTER    >CLEAR
0134- A6 01     0000>              LDA #CLEAR
0136-           0000>              >CTL
0136- 1F 01     0000>>                 BCLR RS,PORTB
0138- 83        0000>              SWI
0139- A6 06     3540           LDA #M.CRNS    ; no shift
013B-           3550           >CTL
013B- 1F 01     0000>              BCLR RS,PORTB
013D- 83        3560           SWI
                3570 *------------------------------
013E- AE 80     3580           LDX #M5
0140- CD 04 02  3590           JSR MESAGE
0143- CD 04 0E  3600           JSR DEBOUNCE
                3610 *------------------------------
0146- 3C 40     3620           INC RATE
0148- B6 40     3630           LDA RATE
014A- A1 12     3640           CMP #18
014C- 25 02     3650.          BLO .4
014E- A6 11     3660           LDA #17
```

```
0150- B7 40      3670 .4       STA RATE
0152-            3680          >CUROFF
0152- A6 OC      0000>           LDA #$0C
0154-            0000>           >CTL
0154- 1F 01      0000>>            BCLR RS,PORTB
0156- 83         0000>            SWI
0157- B6 40      3690          LDA RATE
0159- AA 80      3700          ORA #$80
015B-            3710          >CTL
015B- 1F 01      0000>           BCLR RS,PORTB
015D- 83         3720          SWI
015E- A6 01      3730          LDA #$01
0160-            3740          >DATA
0160- 1E 01      0000>           BSET RS,PORTB
0162- 83         3750          SWI            ; WRITE DOT
0163- A6 20      3760          LDA #$20
0165- B0 40      3770          SUB RATE
0167- AE 16      3780          LDX #$16
0169- CD 02 75   3790          JSR BIP
016C- 03 00 FD   3800 .5       BRCLR 1,PORTA,.5 ;still dn
                 3810 *------------------------------
016F- BE 40      3820 ADJUST   LDX RATE
0171- 5A         3830          DECX           ; make 0-15
0172- 5A         3840          DECX
0173- D6 04 54   3850          LDA DASHTIME,X
0176- B7 4C      3860          STA TH1
0178- 48         3870          ASLA           ; TIMES 2
0179- BB 4C      3880          ADD TH1        ; PLUS 1 (X3)
017B- B7 4D      3890          STA TH2
017D- B7 4E      3900          STA TH3
017F- 10 4A      3910          BSET 0,SPEEDF
0181- CD 04 0E   3920          JSR DEBOUNCE
0184- BC EA      3930          JMP LOOP
                 3940 *------------------------------
0186-            3950 SLOWER   >CLEAR
0186- A6 01      0000>           LDA #CLEAR
0188-            0000>           >CTL
0188- 1F 01      0000>>            BCLR RS,PORTB
018A- 83         0000>            SWI
018B- A6 06      3960          LDA #M.CRNS
018D-            3970          >CTL
018D- 1F 01      0000>           BCLR RS,PORTB
018F- 83         3980          SWI
                 3990 *------------------------------
0190- AE 80      4000          LDX #M5
0192- CD 04 02   4010          JSR MESAGE
0195- CD 04 0E   4020          JSR DEBOUNCE
0198- 3A 40      4030          DEC RATE
019A- B6 40      4040          LDA RATE
019C- A1 02      4050          CMP #2
019E- 22 02      4060          BHI .4
01A0- A6 02      4070          LDA #2
01A2- B7 40      4080 .4       STA RATE
01A4-            4090          >CUROFF
01A4- A6 0C      0000>           LDA #$0C
01A6-            0000>           >CTL
01A6- 1F 01      0000>>            BCLR RS,PORTB
```

```
01A8- 83            0000>           SWI
01A9- B6 40         4100            LDA RATE
01AB- AA 80         4110            ORA #$80
01AD-               4120            >CTL
01AD- 1F 01         0000>           BCLR RS,PORTB
01AF- 83            4130            SWI
01B0- A6 01         4140            LDA #$01
01B2-               4150            >DATA
01B2- 1E 01         0000>           BSET RS,PORTB
01B4- 83            4160            SWI              ; WRITE DOT
01B5- A6 20         4170            LDA #$20
01B7- B0 40         4180            SUB RATE
01B9- AE 16         4190            LDX #$16
01BB- CD 02 75      4200            JSR BIP
01BE- 05 00 FD      4210 .5         BRCLR 2,PORTA,.5
01C1- 20 AC         4220            BRA ADJUST
                    4230 *------------------------------
                    4240 * New character
                    4250 *------------------------------
                    4260 NEW.2
01C3- 3F 48         4270            CLR DPAT
01C5- 3F 47         4280            CLR DCOUNT
01C7- 3F 49         4290            CLR FLAG
                    4300 *------------------------------
                    4310 * New element (dot or dash)
                    4320 *------------------------------
                    4330 NEWELM
01C9- 3F 45         4340            CLR CTH
01CB- 3F 46         4350            CLR CTL
01CD- 3F 4B         4360            CLR DD           ; dot/dash
01CF- 01 00 FD      4370 L1         BRCLR 0,PORTA,L1 ; UP
                    4380 *------------------------------
                    4390 * Key is down. Delay for bounce.
                    4400 *------------------------------
01D2- CD 04 0E      4410            JSR DEBOUNCE
                    4420 *------------------------------
01D5- A6 F8         4430            LDA #DOTTONE
01D7- B7 41         4440            STA TONETC
01D9- B7 08         4450            STA TIMER
01DB-               4460            >TONEON
01DB- 1D 09         0000>           BCLR 6,TCSR
                    4470 *------------------------------
                    4480 * Count the key down time.
                    4490 * Exit when up to UP1, when b/s
                    4500 * timeout (th2) to AT.TH2.
                    4510 *------------------------------
01DD- 01 00 5C      4520 L2         BRCLR 0,PORTA,UP.IN.CHAR
01E0- 3C 46         4530            INC CTL
01E2- 26 F9         4540            BNE L2
01E4- 3C 45         4550            INC CTH
01E6- B6 45         4560            LDA CTH
01E8- B1 4C         4570            CMP TH1
01EA- 27 06         4580            BEQ AT.TH1       ; its a dash
01EC- B1 4D         4590            CMP TH2
01EE- 27 12         4600            BEQ AT.TH2       ; b/s timeout
01F0- 20 EB         4610            BRA L2
                    4620 *------------------------------
                    4630 * Change to dash tone unless at
```

```
                    4640 * fastest rate (rate=17d)
                    4650 *---------------------------------
01F2- B6 40         4660 AT.TH1  LDA  RATE
01F4- A1 11         4670         CMP  #17         ; MAX?
01F6- 27 06         4680         BEQ  .1          ; one tone
01F8- A6 C0         4690         LDA  #DASHTONE
01FA- B7 41         4700         STA  TONETC      ; change tone
01FC- B7 08         4710         STA  TIMER
01FE- 10 4B         4720 .1      BSET 0,DD        ; dash flag
0200- 20 DB         4730         BRA  L2          ; keep going
                    4740 *---------------------------------
                    4750 * Down timeout: backspace if 1st
                    4760 * character; else wait for up.
                    4770 *---------------------------------
0202- B6 47         4780 AT.TH2  LDA  DCOUNT
0204- 26 33         4790         BNE  WAIT.UP     ; not the 1st
0206- CD 03 DC      4800         JSR  BS          ; BACKSPACE
0209- AE 00         4810         LDX  #$00        ; duration
020B- A6 10         4820         LDA  #$10        ; pitch
020D- CD 02 75      4830         JSR  BIP
                    4840 *---------------------------------
                    4850 * Keep counting downtime...
                    4860 *---------------------------------
0210- 3F 46         4870         CLR  CTL
0212- 3F 45         4880         CLR  CTH
0214- 01 00 1D      4890 .1      BRCLR 0,PORTA,BS.END
0217- 3C 46         4900         INC  CTL
0219- 26 F9         4910         BNE  .1
021B- 3C 45         4920         INC  CTH
021D- B6 45         4930         LDA  CTH
021F- A1 F0         4940         CMP  #ERASETC    ; ERASE?
0221- 25 F1         4950         BLO  .1          ; nope
0223- CD 03 AC      4960         JSR  INIT        ; yes: start over
                    4970 *---------------------------------
0226- AE 00         4980         LDX  #$00
0228- A6 12         4990         LDA  #$12
022A- AD 49         5000         BSR  BIP
                    5010 *---------------------------------
                    5020 * RESET When key goes up.
                    5030 *---------------------------------
022C- 00 00 FD      5040 .9      BRSET 0,PORTA,.9
022F- CD 04 0E      5050         JSR  DEBOUNCE
0232- BC A9         5060         JMP  RESET
                    5070 *---------------------------------
                    5080 * Debounce it
                    5090 *---------------------------------
0234- CD 04 0E      5100 BS.END  JSR  DEBOUNCE
0237- BC EA         5110         JMP  LOOP
                    5120 *---------------------------------
                    5130 WAIT.UP
0239- 00 00 FD      5140         BRSET 0,PORTA,WAIT.UP
                    5150 *---------------------------------
                    5160 UP.IN.CHAR
023C- CD 04 0E      5170         JSR  DEBOUNCE
                    5180 *---------------------------------
023F-               5190         >TONEOFF
023F- 1C 09         0000>        BSET 6,TCSR
```

```
0241- 18 01     0000>               BSET 4,PORTB    ; OV ON SPKR
0243- B6 47     5200                LDA DCOUNT
0245- A1 07     5210                CMP #7
0247- 25 04     5220                BLO UPD
0249- 10 49     5230                BSET 0,FLAG     ; overrun
024B- 20 06     5240                BRA UP.1        ; skip upd
                5250    *--------------------------------
                5260    * Update Dcount and DD
                5270    *--------------------------------
024D- 3C 47     5280    UPD         INC DCOUNT
024F- 34 4B     5290                LSR DD
0251- 39 48     5300                ROL DPAT        ; shift it in
                5310    *--------------------------------
                5320    * Check for down
                5330    *--------------------------------
0253- 3F 45     5340    UP.1        CLR CTH
0255- 3F 46     5350                CLR CTL
0257- 00 00 0E  5360    .1          BRSET 0,PORTA,ELEMDONE
025A- 3C 46     5370                INC CTL
025C- 26 F9     5380                BNE .1
025E- 3C 45     5390                INC CTH
0260- B6 45     5400                LDA CTH
0262- B1 4E     5410                CMP TH3         ; end letter?
0264- 27 05     5420                BEQ UPTIMEOUT
0266- 20 EF     5430                BRA .1
                5440    *--------------------------------
                5450    ELEMDONE
                5460    *--------------------------------
                5470    * It's down again, without t/o
                5480    *--------------------------------
0268- CC 01 C9  5490                JMP NEWELM
                5500    *--------------------------------
                5510    UPTIMEOUT
                5520    *--------------------------------
                5530    * It's timed out (up): new char
                5540    *--------------------------------
026B- AD 1F     5550                BSR LOOK        ; display it
026D- A6 14     5560                LDA #20
026F- AE 0A     5570                LDX #10
0271- AD 02     5580                BSR BIP
0273- BC EA     5590                JMP LOOP
                5600    *--------------------------------
                5610    *--------------------------------
                5620    * Subroutines.
                5630    *--------------------------------
                5640    * Make a little bip sound.
                5650    * Pitch in A, duration in X
                5660    *--------------------------------
0275- 9B        5670    BIP         SEI
0276- B7 43     5680                STA TEMP
0278- B6 43     5690    .1          LDA TEMP
027A- 4A        5700    .2          DECA
027B- 26 FD     5710                BNE .2
027D- A6 10     5720                LDA #$10        ; BIT 4
027F- B8 01     5730                EOR PORTB
0281- B7 01     5740                STA PORTB
0283- 5A        5750                DECX
```

```
0284- 26 F2      5760          BNE .1
0286-            5770         >TONEOFF
0286- 1C 09      0000>         BSET 6,TCSR
0288- 18 01      0000>         BSET 4,PORTB  ; 0V ON SPKR
028A- 9A         5780          CLI
028B- 81         5790          RTS
                 5800 *----------------------------------
                 5810 *----------------------------------
                 5820 * Look up character.
                 5830 *----------------------------------
028C- B6 48      5840 LOOK     LDA DPAT
028E- BE 47      5850          LDX DCOUNT
0290- 5A         5860          DECX
0291- 26 06      5870          BNE .1
0293- 97         5880          TAX
0294- D6 04 16   5890          LDA ONE,X
0297- 20 58      5900          BRA SHOWIT
                 5910 *----------------------------------
0299- 5A         5920 .1       DECX
029A- 26 06      5930          BNE .2
029C- 97         5940          TAX
029D- D6 04 18   5950          LDA TWO,X
02A0- 20 4F      5960          BRA SHOWIT
                 5970 *----------------------------------
02A2- 5A         5980 .2       DECX
02A3- 26 06      5990          BNE .3
02A5- 97         6000          TAX
02A6- D6 04 1C   6010          LDA THREE,X
02A9- 20 46      6020          BRA SHOWIT
                 6030 *----------------------------------
02AB- 5A         6040 .3       DECX
02AC- 26 06      6050          BNE .4
02AE- 97         6060          TAX
02AF- D6 04 24   6070          LDA FOUR,X
02B2- 20 3D      6080          BRA SHOWIT
                 6090 *----------------------------------
02B4- 5A         6100 .4       DECX
02B5- 26 06      6110          BNE .5
02B7- 97         6120          TAX
02B8- D6 04 34   6130          LDA FIVE,X
02BB- 20 34      6140          BRA SHOWIT
                 6150 *----------------------------------
02BD- 5A         6160 .5       DECX
02BE- 26 18      6170          BNE HUH       ; ERROR
02C0- A1 15      6180          CMP #$15      ; 000 010101
02C2- 26 04      6190          BNE .51
02C4- A6 2E      6200          LDA #$2E      ; '.'
02C6- 20 29      6210          BRA SHOWIT
02C8- A1 0C      6220 .51      CMP #$0C      ; 000 001100
02CA- 26 04      6230          BNE .52
02CC- A6 3F      6240          LDA #$3F      ; ?
02CE- 20 21      6250          BRA SHOWIT
02D0- A1 33      6260 .52      CMP #$33      ; 000 110011
02D2- 26 04      6270          BNE HUH
02D4- A6 2C      6280          LDA #$2C      ; ','
02D6- 20 19      6290          BRA SHOWIT
                 6300 *----------------------------------
```

```
                6310 * It's nothing recognizable...
                6320 *------------------------------
02D8- A6 10     6330 HUH     LDA #CLNS
02DA-           6340         >CTL
02DA- 1F 01     0000>         BCLR RS,PORTB
02DC- 83        6350         SWI
02DD- A6 20     6360         LDA #$20
02DF- AE 16     6370         LDX #$16
02E1- CD 02 75  6380         JSR BIF
                6390 *------------------------------
                6400 * DELAY
                6410 *------------------------------
02E4- 4F        6420         CLRA
02E5- AE 40     6430         LDX #$40
02E7- 4A        6440 .1      DECA
02E8- 26 FD     6450         BNE .1
02EA- 5A        6460         DECX
02EB- 26 FA     6470         BNE .1
02ED- A6 14     6480         LDA #CRNS
02EF- 83        6490         SWI
02F0- 81        6500         RTS
                6510 *------------------------------
02F1- A1 40     6520 SHOWIT  CMP #$40       ; '@'?
02F3- 27 03     6530         BEQ .7         ; illegal
02F5- 01 49 03  6540         BRCLR 0,FLAG,.9 ; no orun
02F8- CC 02 D8  6550 .7      JMP HUH
02FB- B7 43     6560 .9      STA TEMP
02FD- BE 42     6570         LDX CPOS
02FF- A3 13     6580         CPX #DISLEN-1  ; end pos.
0301- 25 21     6590         BLO .3         ; no shift reqd
                6600 *------------------------------
                6610 * Display shift left required.
                6620 * Move all bytes down one in BUFF
                6630 *------------------------------
0303- 5F        6640         CLRX
0304- E6 53     6650 .51     LDA BUFF+1,X
0306- E7 52     6660         STA BUFF,X
0308- 5C        6670         INCX
0309- A3 12     6680         CPX #DISLEN-2
030B- 26 F7     6690         BNE .51
030D- B6 43     6700         LDA TEMP
030F- E7 52     6710         STA BUFF,X
0311- A6 07     6720         LDA #M.CRSH
0313-           6730 .4      >CTL
0313- 1F 01     0000>         BCLR RS,PORTB
0315- 83        6740         SWI
0316- B6 43     6750         LDA TEMP
0318-           6760 .2      >DATA
0318- 1E 01     0000>         BSET RS,PORTB
031A- 83        6770         SWI            ; show the character
                6780 *------------------------------
031B- B6 43     6790         LDA TEMP
031D- A1 20     6800         CMP #$20       ; blank?
031F- 26 02     6810         BNE .1         ; nope
0321- AD 0B     6820         BSR UART       ; send it out
0323- 81        6830 .1      RTS
                6840 *------------------------------
```

```
0324- B6 43     6850 .3      LDA TEMP
0326- E7 52     6860         STA BUFF,X
0328- A6 06     6870         LDA #M.CRNS
032A- 3C 42     6880         INC CPOS
032C- 20 E5     6890         BRA .4
                6900 *------------------------
032E- BE 42     6910 UART    LDX CPOS        ; (0-19)
0330- 5A        6920         DECX
0331- 27 0B     6930         BEQ .2          ; left margin
0333- 5A        6940 .1      DECX
0334- 27 08     6950         BEQ .2
0336- E6 52     6960         LDA BUFF,X
0338- A1 20     6970         CMP #$20
033A- 27 02     6980         BEQ .2          ; found space
033C- 20 F5     6990         BRA .1
033E- E6 52     7000 .2      LDA BUFF,X
0340- AD 10     7010         BSR SOUT
0342- 5C        7020 .3      INCX
0343- A3 20     7030         CPX #$20
0345- 27 0A     7040         BEQ .4
0347- E6 52     7050         LDA BUFF,X
0349- A1 20     7060         CMP #$20
034B- 27 04     7070         BEQ .4
034D- AD 03     7080         BSR SOUT
034F- 20 F1     7090         BRA .3
0351- 81        7100 .4      RTS
                7110 *------------------------
0352- B7 50     7120 SOUT    STA SOTEMP
0354- 10 01     7130         BSET 0,PORTB    ; start bit
0356- AD 1C     7140         BSR UDELAY
0358- BF 51     7150         STX TX1         ; temp X
035A- AE 07     7160         LDX #7          ; 8 bit ctr
035C- 36 50     7170 .1      ROR SOTEMP      ; lsb first
035E- 25 04     7180         BCS .3
0360- 10 01     7190         BSET 0,PORTB
0362- 20 04     7200         BRA .2
0364- 11 01     7210 .3      BCLR 0,PORTB
0366- 20 00     7220         BRA .2          ; equal time
0368- AD 0A     7230 .2      BSR UDELAY
036A- 5A        7240         DECX
036B- 26 EF     7250         BNE .1
036D- 11 01     7260         BCLR 0,PORTB    ; stop bit
036F- AD 03     7270         BSR UDELAY
0371- BE 51     7280         LDX TX1
0373- 81        7290         RTS
                7300 *------------------------
0374- 4F        7310 UDELAY  CLRA
0375- 4A        7320 .1      DECA
0376- 26 FD     7330         BNE .1
0378- A6 0A     7340         LDA #$0A        ; a tad more
037A- 4A        7350 .2      DECA
037B- 26 FD     7360         BNE .2
037D- 81        7370         RTS
                7380 *------------------------
                7390 * Write byte in A to display.
                7400 * Called with SWI instr. so that
                7410 * interrupt flag is preserved,
```

```
                  7420 * and the LCD access is never
                  7430 * interrupted by the timer.
                  7440 *
                  7450 * Before calling, set RS for data
                  7460 * or control. NOTE: A,X preserved
                  7470 * by SWI call.
                  7480 *----------------------------------
037E- B7 00       7490 WRITEA STA PORTA
0380- B7 44       7500        STA WRDATA
0382- A6 F0       7510        LDA #$F0      ; OUTPUT
0384- B7 04       7520        STA DDRA
0386- 1D 01       7530        BCLR RD,PORTB ; write
0388- 1A 01       7540        BSET E,PORTB  ; write it
038A- 1B 01       7550        BCLR E,PORTB
                  7560 *----------------------------------
                  7570 * Now the low 4 bits.
                  7580 *----------------------------------
038C- B6 44       7590        LDA WRDATA
038E- 49          7600        ROLA
038F- 49          7610        ROLA
0390- 49          7620        ROLA
0391- 49          7630        ROLA
0392- B7 00       7640        STA PORTA
0394- 1A 01       7650        BSET E,PORTB
0396- 1B 01       7660        BCLR E,PORTB  ; write it
                  7670 *----------------------------------
                  7680 * Check the busy bit
                  7690 *----------------------------------
0398- 3F 04       7700        CLR DDRA      ; input
039A-             7710        >CTL
039A- 1F 01       0000>       BCLR RS,PORTB
039C- 1C 01       7720        BSET RD,PORTB ; read
039E- 1A 01       7730 .1     BSET E,PORTB  ; strobe it
03A0- B6 00       7740        LDA PORTA
03A2- 1B 01       7750        BCLR E,PORTB
03A4- 1A 01       7760        BSET E,PORTB  ; dummy rd
03A6- 1B 01       7770        BCLR E,PORTB
03A8- 49          7780        ROLA
03A9- 25 F3       7790        BCS .1
03AB- 80          7800        RTI
                  7810 *----------------------------------
                  7820 * Initialize the Hitachi LCD disp
                  7830 *----------------------------------
03AC-             7840 INIT   >CTL
03AC- 1F 01       0000>       BCLR RS,PORTB
                  7850 *----------------------------------
                  7860 * Send format info 3 times, per
                  7870 * data sheet (in case pwr-on
                  7880 * reset conditions not met).
                  7890 *----------------------------------
03AE- A6 20       7900        LDA #FORMAT
03B0- 83          7910        SWI
03B1- AD 5B       7920        BSR DEBOUNCE  ; wait
03B3- A6 20       7930        LDA #FORMAT
03B5- 83          7940        SWI
03B6- AD 56       7950        BSR DEBOUNCE  ; wait
03B8- A6 20       7960        LDA #FORMAT
03BA- 83          7970        SWI
```

```
                        7980 *----------------------------------
                        7990 * Download custom characters
                        8000 *----------------------------------
03BB- 5F                8010        CLRX
03BC- 9F                8020 .1     TXA
03BD- A4 3F             8030        AND #$3F        ; form addr.
03BF- AA 40             8040        ORA #$40        ; 01AAAAAA
03C1-                   8050        >CTL
03C1- 1F 01             0000>        BCLR RS,PORTB
03C3- 83                8060        SWI
03C4-                   8070        >DATA
03C4- 1E 01             0000>        BSET RS,PORTB
03C6- D6 04 64          8080        LDA GRSET,X
03C9- 83                8090        SWI             ; send it
03CA- 5C                8100        INCX
03CB- A3 40             8110        CPX #64
03CD- 26 ED             8120        BNE .1
                        8130 *
03CF- A6 06             8140        LDA #M.CRNS
03D1- 83                8150        SWI
03D2- A6 0E             8160        LDA #DISON
03D4- 83                8170        SWI
03D5- A6 01             8180        LDA #CLEAR
03D7- 83                8190        SWI
03D8- A6 02             8200        LDA #HOME
03DA- 83                8210        SWI
03DB- 81                8220        RTS
                        8230 *----------------------------------
03DC- B6 42             8240 BS     LDA CPOS
03DE- 27 21             8250        BEQ .1
03E0- 3A 42             8260        DEC CPOS
03E2-                   8270        >CTL
03E2- 1F 01             0000>        BCLR RS,PORTB
                        8280 *----------------------------------
                        8290 * set enter mode for no shift
                        8300 *----------------------------------
03E4- A6 06             8310        LDA #M.CRNS     ; chg mode
03E6- 83                8320        SWI
03E7- A6 10             8330        LDA #CLNS
03E9- 83                8340        SWI
03EA-                   8350        >DATA
03EA- 1E 01             0000>        BSET RS,PORTB
03EC- A6 20             8360        LDA #$20        ; BLANK
03EE- BE 42             8370        LDX CPOS
03F0- E7 52             8380        STA BUFF,X
03F2- 83                8390        SWI
03F3-                   8400        >CTL
03F3- 1F 01             0000>        BCLR RS,PORTB
03F5- A6 10             8410        LDA #CLNS
03F7- 83                8420        SWI
                        8430 *----------------------------------
                        8440 * If CPOS>19 switch back to
                        8450 * 'crsh' enter mode
                        8460 *----------------------------------
03F8- B6 42             8470        LDA CPOS
03FA- A1 13             8480        CMP #DISLEN-1   ; end pos.
03FC- 25 03             8490        BLO .1
```

```
03FE- A6 07     8500           LDA  #M.CRSH
0400- 83        8510           SWI
0401- 81        8520 .1        RTS
                8530 *------------------------------------
                8540 * Write a messgae on the panel.
                8550 * X is pointer to page 0 message,
                8560 * ending with $FF.
                8570 *------------------------------------
0402- F6        8580 MESAGE    LDA ,X
0403- A1 FF     8590           CMP #$FF
0405- 27 06     8600           BEQ .1
0407-           8610           >DATA
0407- 1E 01     0000>          BSET RS,PORTB
0409- 83        8620           SWI.
040A- 5C        8630           INCX
040B- 20 F5     8640           BRA MESAGE
040D- 81        8650 .1        RTS
                8660 *------------------------------------
                8670 DEBOUNCE
040E- 3F 4F     8680           CLR DBCTR
0410- 3A 4F     8690 .1        DEC DBCTR
0412- 9D        8700           NOP
0413- 26 FB     8710           BNE .1
0415- 81        8720           RTS
                8730 *------------------------------------
                8740 *------------------------------------
0416- 45 54     8750 ONE       .AS 'ET'
0418- 49 41 4E
041B- 4D        8760 TWO       .AS 'IANM'
041C- 53 55 52
041F- 57 44 4B
0422- 47 4F     8770 THREE     .AS 'SURWDK6O'
0424- 48 56 46
0427- 20 4C 40
042A- 50 4A 42
042D- 58 43 59
0430- 5A 51 40
0433- 40        8780 FOUR      .AS 'HVF L@PJBXCYZQ@@'
0434- 35 34 40
0437- 33 40 40
043A- 40 32     8790 FIVE      .AS '54@3@@@2'
                8800 *------------------------------------
043C- 40 21 40
043F- 40 40 40
0442- 40 31     8810           .AS '@!@@@@@1'
0444- 36 40 40
0447- 40 40 40
044A- 40 40     8820           .AS '6@@@@@@@'
044C- 37 40 40
044F- 40 38 40
0452- 39 30     8830           .AS '7@@@8@90'
                8840 *------------------------------------
                8850 DASHTIME
0454- 55 50 40
0457- 3A 38 36
045A- 34 32     8860           .HS 5550403A38363432
045C- 30 2E 2C
```

```
045F- 2A 28 26
0462- 1A 10        8870            .HS 302E2C2A28261A10    .
                   8880  *----------------------------------
0464- 00 0F 1F
0467- 1F 1F 0F
046A- 00 00        8890  GRSET     .HS 000F1F1F1F0F0000  ; 0
046C- 00 1F 1F
046F- 1F 1F 1F
0472- 00 00        8900            .HS 001F1F1F1F1F0000  ; 1
0474- 00 1E 1F
0477- 1F 1F 1E
047A- 00 00        8910            .HS 001E1F1F1F1E0000  ; 2
047C- 00 0E 1F
047F- 1F 1F 0E
0482- 00 00        8920            .HS 000E1F1F1F0E0000  ; 3
0484- 04 07 04
0487- 04 04 07
048A- 04 00        8930            .HS 0407040404070400  ; 4
048C- 00 1F 00
048F- 00 00 1F
0492- 00 00        8940            .HS 001F0000001F0000  ; 5
0494- 04 1C 04
0497- 04 04 1C
049A- 04 00        8950            .HS 041C0404041C0400  ; 6
049C- 00 1F 00
049F- 00 00 1F
04A2- 00 00        8960            .HS 001F0000001F0000  ; 7
                   8970  CODE.END
                   8980  *----------------------------------
                   8990            .DO EPROM
                   9020            .ELSE
                   9030            .OR $07F6
                   9040            .TA $47F6
                   9050            .FIN
                   9060  *----------------------------------
07F6- 00 A9        9070            .DA RESET      ; Timer-wait
07F8- 00 98        9080            .DA TIMINT     ; Timer
07FA- 00 95        9090            .DA IRQ        ; IRQ
07FC- 03 7E        9100            .DA WRITEA     ; SWI
07FE- 00 A5        9110            .DA PWRON      ; Reset
```

<10185-01.A10>

The software program listed in the preceding Table A implements a decoding method that allows a very wide variation in sending style and rate, by giving the operator immediate feedback when the device detects a dot, a dash, and the silent inter-character pause interval.

Since the feedback signals generated by the device 1 are under software control, the feedback to the operator enables him or her to know if the device 1 is receiving the input coded signals at a desirable receiving rate. If not, the rate can be easily adjusted, since the operator knows instantly how the switch signals from the switch 8 are interpreted. For example, if the decoding rate is set too fast, the operator will not be able to send dots, since the dash tone signal will occur before the operator can release the switch 8. In this case, the rate control needs to be decreased by depressing timing pushbutton switch 9.

An inter-character pause feedback signal is also generated to indicate that switch 8 has been open (silent) for a sufficient period of time to determine that the last series of dots and dashes comprise a character, and thus, are to be decoded as a character. Following this end-of-character switch-up time period, the thus formed character is displayed on the display panel 2, and a "tick" sound is enunciated from the speaker 3. This sound is a prompt to the operator that the next series of elements (dots and dashes) can now be entered. This audible feedback signal is generated in addition to the visual feedback signal (display of the character just entered).

This decoding method thus guides the operator through the process of sending code by giving positive feedback for every critical timing point in the formulation of the code. The operator hears (or sees, in the case of a deaf operator) the difference between a dot and a dash as it is entered in the device 1, and learns to wait for the letter to appear before entering the next character.

One advantage of this decoding method is that the dot/dash discrimination time and the inter-character pause time, can be made independent of each other, rather than being fixed by the rigidly defined ratios of the Morse Code. The device 1 can thus be easily "fine tuned" for many different levels of operator ability.

For example, good success with untrained operators who were incapable of sending Morse Code has been achieved by making the dash threshold time to be about 0.5 second, and the end-of-letter time to be about 2 seconds. This represents an end-of-character time to dash time ratio of about 4, which is far more than the defined ratio of 1 which is allowed by Morse Code.

Even with the feedback signals generated by the device 1, characters can be sent incorrectly, particularly by operators with motor skill problems. For this reason, a simple editing facility is provided. To erase an incorrect character from the display, the user simply holds the switch 8 closed until the character disappears from the display panel 2, and then opens the switch 8.

Thus, for the backspace function, visual feedback is given by deleting the character from the display, and an audible feedback signal is given by sounding a short tone of frequency F3 from the speaker 3. An erase sequence thus sounds like a dash (FI followed by F2), and then a short "bip" sound (F3).

The entire display can be deleted by maintaining the switch 8 closed even longer. After the appropriate time (defined in the computer program), a short tone of frequency, F4, sounds and the display message is deleted or erased. An erase sequence thus sounds like a dash (F1-F2), a backspace "bip" (F3) and a different "bip" (F4).

Once an inter-word space character is decoded, the completed word is sent from the RS-232 compatible serial output connector 4 (FIG. 1). In the preferred form of the invention, the serial porting via the output connector 4, is implemented in the software program at a 300 Baud transfer rate.

Although the invention has been described with reference to the Morse code as an input code and ASCII as an output code, it is to be understood that other on-off input codes and other output formats can be provided within the inventive concepts herein disclosed. Moreover, the inventive device 1 can be used for other purposes as well. For example, an audible, properly timed Morse Code output signal can be generated for radio communication purposes. For another example, switched electrical output signals can be generated to control various external devices (not shown), to enable the user to operate home appliances, control lights, or perform other control functions, by manipulating the single operator-selected switch 8.

Furthermore, upon a review of the foregoing description, it will become apparent to those skilled in the art that the device can be programmed to provide prestored messages, such as the message 2A, that can be recalled by inputting a preselected combination of characters, or specially selected dot and dash combinations.

As various changes may be made in the form, construction, and arrangement of the procedures and parts described herein, without departing from the spirit and scope of the invention and without sacrificing any of its advantages, all matter herein is to be interpreted as illustrative and not in any limiting sense.

What is claimed is:

1. A device for generating an output information message in response to a sequence of coded information switch closures, comprising:
   single input means for detecting the sequence of switch closures, each of varying duration;
   dot feedback means including timing means for generating a predetermined dot interval when said input means detects a switch closure;
   said dot feedback means being responsive to the input means detecting said switch closure for generating a preselected first timing interval following said dot interval;
   said dot feedback means including means responsive to said timing means completing said dot interval for generating a human-sensible dot feedback signal to alert an operator that said switch closure has been detected and that the switch closure should be discontinued if a dot signal is intended;
   dot generation means responsive to the input means detecting said switch closure being discontinued within said first timing interval, for generating a dot information signal;
   dash feedback means responsive to the input means detecting said switch closure that is not discontinued within said first timing interval, for generating a human-sensible dash feedback signal to alert the operator that the switch closure has been of sufficient duration to be decoded as a dash;
   dash generation means responsive to the input means detecting said switch closure that is not discontinued within the preselected first timing interval for generating a dash information signal;
   silent interval means responsive to the input means detecting said switch closure being discontinued beyond a preselected second time interval, for generating a human sensible end-of-letter signal to alert the operator that the switch has been released long enough for the previous dots and dashes to be decoded into a character;
   interdigital silent interval means responsive to said input means detecting another switch closure with said second time interval, to decode a subsequent digit such as a dot or a dash, being initialed by said other switch closure, and the previously decoded digits as being part of a single character information; and
   decoding means for converting a coded sequence of dot and dash information signals to an output information message in a desired format.

2. The device recited in claim 1, further comprising:
   backspace means responsive to the input means detecting said switch closure having a duration that extends beyond a third timing interval, for generating a backspace information signal.

3. The device recited in claim 1 further comprising:
   erase means responsive to the input means detecting said switch closure having a duration that extends beyond a preselected fourth timing interval, for generating an erase information signal.

4. The device recited in claim 1, further comprising:
   first adjustment means for enabling manual adjustment of said first timing interval.

5. The device recited in claim 1, further comprising:
   second adjustment means for enabling manual adjustment of said second timing interval.

6. The device recited in claim 1, further comprising:
   display means responsive to the decoding means for providing a visually discernible image of the information message.

7. The device recited in claim 1, wherein the input means includes:
microprocessor means.

8. The device recited in claim 1, wherein:
the dot feedback means includes first audio means for providing a first audible tone.

9. The device recited in claim 1, wherein:
the dash feedback means includes second audio means for providing a second audible tone.

10. The device recited in claim 4, further comprising:
timing adjustment feedback means for proving a human-sensible signal indicative of a timing adjustment.

11. The device recited in claim 10, wherein the timing adjustment feedback means includes:
a visually discernible image of a range of incremental timing adjustments; and
cursor means for providing a visually discernible image along said range as an indication of a timing adjustment.

12. The device recited in claim 1, further comprising:
output means for encoding an electrical signal with the information message in a selected character code.

13. The device recited in claim 12, wherein:
the output means includes means for encoding the electrical signal using ASCII character code.

14. The device recited in claim 13, wherein the output means includes:
output port means for enabling transmission of the electrical signal to a separate user-selected apparatus.

15. The device recited in claim 14, wherein the output port means includes:
RS-232 means for enabling interconnection according to a conventional RS-232 format.

* * * * *